(12) United States Patent
Sato

(10) Patent No.: US 9,464,161 B2
(45) Date of Patent: Oct. 11, 2016

(54) MASTERBATCH-TYPE LATENT CURING AGENT FOR EPOXY RESIN, AND EPOXY RESIN COMPOSITION USING THE SAME

(75) Inventor: Daisuke Sato, Kuku (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/994,441

(22) PCT Filed: Dec. 5, 2011

(86) PCT No.: PCT/JP2011/006794
§ 371 (c)(1),
(2), (4) Date: Jun. 14, 2013

(87) PCT Pub. No.: WO2012/081192
PCT Pub. Date: Jun. 21, 2012

(65) Prior Publication Data
US 2013/0267663 A1    Oct. 10, 2013

(30) Foreign Application Priority Data
Dec. 17, 2010    (JP) .................................. 2010-281409

(51) Int. Cl.
| | | |
|---|---|---|
| *C08G 59/56* | (2006.01) | |
| *C08G 59/62* | (2006.01) | |
| *C08L 63/00* | (2006.01) | |
| *C08L 63/02* | (2006.01) | |
| *C08L 63/04* | (2006.01) | |
| *C08G 59/18* | (2006.01) | |
| *C08J 3/22* | (2006.01) | |
| *C08J 3/24* | (2006.01) | |
| *C08J 5/24* | (2006.01) | |
| *C08G 18/58* | (2006.01) | |

(52) U.S. Cl.
CPC .............. *C08G 59/621* (2013.01); *C08G 18/58* (2013.01); *C08G 59/184* (2013.01); *C08G 59/56* (2013.01); *C08J 3/226* (2013.01); *C08J 3/241* (2013.01); *C08J 5/24* (2013.01); *C08L 63/00* (2013.01); *C08L 63/04* (2013.01); *C08J 2363/00* (2013.01); *C08J 2463/00* (2013.01)

(58) Field of Classification Search
None
See application file for complete search history.

(56) References Cited

U.S. PATENT DOCUMENTS

| | | | |
|---|---|---|---|
| 5,480,957 A  * | 1/1996 | Muroi et al. ................... | 528/87 |
| 2006/0128835 A1 | 6/2006 | Usui et al. | |

FOREIGN PATENT DOCUMENTS

| | | | |
|---|---|---|---|
| JP | 52 3828 | | 8/1993 |
| JP | 10 168288 | | 6/1998 |
| JP | 2009-120724 A | * | 6/2009 |
| JP | 2009 132931 | | 6/2009 |
| WO | WO-2009 060576 | | 5/2009 |

OTHER PUBLICATIONS

Parchem Chemical Products Catalog, EP-4901 E, 2014, one page.*
Parchem EP-4901E, 2015, one page.*
Adeka Corp., "Method for producing latent curing agent for powder epoxy resin, latent curing agent for powder epoxy resin obtained by the method, and curable epoxy resin composition using the same," Espacenet, Publication Date: May 14, 2009; English Abstract of WO-2009 060576.
English Translation of Claim 1 for JP-52 3828, Publication Date: Aug. 13, 1993.
International Search Report for PCT/JP2011/006794, Date of the actual completion of the international search: Feb. 29, 2012, Date of mailing of the international search report: Mar. 13, 2012.
Nippon Elctric Glass Co., "Cover member for reinforcing device of optical fiber juncture and production thereof," Thomson Innovation, Publication Date: Aug. 13, 1993; English Abstract of JP-52 03828.
Somar Corp., "Silica-containing liquid epoxy resin composition used as semiconductor sealant comprises liquid epoxy resin, powdered silica with specified average particle size, sorbitol surfactant and liquid organopolysiloxane containing epoxy group(s)," Thomson Innovation, Publication Date: Jun. 23, 1998: English Abstract of JP-10 168288.

* cited by examiner

*Primary Examiner* — Robert Sellers
(74) *Attorney, Agent, or Firm* — Millen, White, Zelano & Branigan, P.C.

(57) ABSTRACT

The masterbatch-type latent curing agent for epoxy resin comprised of (A) glycidyl ether type epoxy resin, (B) a fine particle of mixture containing (B-1) 50 to 99 mass % of adduct-modified amine obtained by reacting the glycidyl ether type epoxy resin with a polyamine compound and (B-2) 50 to 1 mass % of a phenol compound, (C) an active hydrogen compound and (D) an isocyanate compound; and a one-component curable epoxy resin composition containing the masterbatch-type latent curing agent and epoxy resin.

3 Claims, No Drawings

MASTERBATCH-TYPE LATENT CURING AGENT FOR EPOXY RESIN, AND EPOXY RESIN COMPOSITION USING THE SAME

TECHNICAL FIELD

The present invention relates to a masterbatch-type latent curing agent for epoxy resin and an epoxy resin composition using the same, and in particular, it relates to a masterbatch-type latent curing agent for epoxy resin having excellent curing properties and stability, which can be obtained from fine particles comprised of a mixture of glycidyl ether type epoxy resin, adduct-modified amine and a phenol compound, an active hydrogen compound and an isocyanate compound.

BACKGROUND ART

Epoxy resin has an excellent adhesive properties to various types of base materials, and a cured material obtained by curing epoxy resin with a curing agent is relatively superior in heat resistance, chemical resistance, electric properties and mechanical characteristics or the like. Therefore, it has been widely used for coating materials, adhesive agents and various molding materials.

Conventionally, the mainstream of epoxy resin composition has been a two-component type wherein the addition of a curing agent or a curing accelerator is required just before use. The two-component type epoxy resin composition has characteristics in that it can cure a resin composition at ordinary temperatures or low temperature. However, on the other hand, the two-component type epoxy resin composition is required to measure each component and blend the measured composition each other just before use. In addition, since the available time of the blended composition is short, it was difficult to apply the blended composition to an automatic machine. These were the problems to be solved in the epoxy resins in that the use conditions of the epoxy resins were limited. In order to solve such problems of the epoxy resins, one-component curable epoxy resin composition was desired.

In order to obtain such one-component curable resin composition, a curing agent having properties which does not initiate a reaction at room temperature but initiates the reaction by heat to cure the composition, a so-called latent curing agent is required. As examples of latent curing agent, for example, dicyandiamide, dibasic acid dihydrazide, boron trifluoride amine complex salt, guanamines, melamines and imidazoles are proposed.

However, for example, the compositions obtained by blending dicyandiamide, melamine or guanamines with epoxy resin were excellent in storage stability but had a problem that a heating for a long time at high temperature of 150° C. or more were required in order to cure the compositions.

Furthermore, it was also widely carried out to combine the curing accelerators with these latent curing agents in order to shorten a curing time, however, a problem that the storage stability is remarkably decreased occurs.

On the other hand, although dibasic acid dihydrazide and imidazoles can initiate the curing reaction at relatively lower temperature, the storage stabilities of these systems were poor. Although boron trifluoride amine complex salt has advantages that the storage stability is excellent and the curing time is short, it has disadvantages that corrosive properties against metals is high and water resistance is poor.

A lot of microcapsule type latent curing agents for epoxy resin, which are obtained by treating a surface of the amine curing agents such as amine epoxy adducts by polyisocyanate, have been proposed. However, they have not satisfied sufficiently yet performances such as storage stability and curing properties when heating.

Some proposals have been made as follows: for example, the microcapsule type curing agents wherein a curing agent is a core component and a thermoplastic resin is a shell component (Patent document 1); the curing agents for epoxy resin obtained by reacting a fine powder, which is comprised of a mixture of a compound having a primary amino group or a secondary amino group and a compound having a tertiary amino group, but having neither primary amino group nor secondary amino group, with an isocyanate compound (Patent document 2); the powder curing agents for epoxy resin having a spherical shape, which are the solid adducts synthesized from amine compounds and epoxy compounds (Patent document 3). However, any of them has not satisfied the storage stability and curing properties when heated.

PRIOR ART DOCUMENTS

Patent document 1: Japanese Unexamined Patent Publication Tokkaihei 9-3164
Patent document 2: Japanese Unexamined Patent Publication Tokkaihei 4-314724
Patent document 3: Japanese Patent No. 3098760

DISCLOSURE OF INVENTION

Problems to be Solved by the Invention

The first object of the present invention is to provide a latent curing agent for epoxy resin, which can impart excellent storage stability and curing properties when heated to epoxy resin.

In addition, the second object of the present invention is to provide a one-component curable epoxy resin composition having excellent storage stability and curing properties when heated.

Means for Solving the Problems

As a result of extensive studies, the inventors of the present invention have found that a one-component curable epoxy resin composition having excellent storage stability and curing properties when heated can be obtained by using a masterbatch-type latent curing agent for epoxy resin containing a specified component, thereby achieving the present invention.

Namely, the present invention is a masterbatch-type latent curing agent for epoxy resin obtained from the following components of (A)~(D), and a one-component curable epoxy resin composition comprised of epoxy resin and the said masterbatch-type latent curing agent for epoxy resin.
(A) Glycidyl ether type epoxy resin,
(B) A fine particle of a mixture containing (B-1) 50~99 mass % of adduct-modified amine obtained by reacting the glycidyl ether type epoxy resin with a polyamine compound, and (B-2) 50~1 mass % of a phenol compound,
(C) An active hydrogen compound and
(D) An isocyanate compound.

The masterbatch-type latent curing agent for epoxy resin of the present invention may be a reaction product obtained by reacting the above component (D) with the mixture of the components of the above (A)~(C).

It is preferable that the chlorine concentration in the glycidyl ether type epoxy resin used for the above component (A) is 2000 ppm or less.

In addition, it is preferable that the viscosity of the masterbatch-type latent curing agent for epoxy resin of the present invention is within the range of 20 Pa·s/25° C.~400 Pa·s/25° C.

Effect of the Invention

The epoxy resin composition having excellent storage stability and curing properties can be obtained by using the masterbatch-type latent curing agent for epoxy resin of the present invention.

BEST MODES FOR CARRYING OUT THE INVENTION

The masterbatch-type latent curing agent for epoxy resin of the present invention can be obtained by using the following components from (A) to (D).

Examples of the above component (A) glycidyl ether type epoxy resin are polyglycidyl ether compounds of mononuclear polyphenol compounds such as hydroquinone, resorcin, pyrocatechol and phloroglucinol; polyglycidyl ether compounds of polynuclear polyphenol compounds such as dihydroxy naphthalene, biphenol, methylene bisphenol (bisphenol F), methylene bis(orthocresol), ethylidene bisphenol, isopropylidene bisphenol (known as bisphenol A), isopropylidene bis(orthocresol), tetrabromo bisphenol A, 1,3-bis(4-hydroxycumylbenzene), 1,4-bis(4-hydroxycumylbenzene), 1,1,3-tris(4-hydroxyphenyl)buthane, 1,1,2,2-tetra(4-hydroxyphenyl)ethane, thiobisphenol, sulfonylbisphenol, oxybisphenol, phenolnovolac, orthocresolnovolac, ethylphenolnovolac, butylphenolnovolac, octylphenolnovolac, resorcinnovolac or terpene phenol; polyglycidyl ether compounds of polyhydric alcohols such as ethylene oxide addition products of bisphenol A, ethylene glycol, propylene glycol, butylene glycol, hexanediol, polyglycol, thiodiglycol, glycerin, trimethylol propane, pentaerythritol or sorbitol.

When the chlorine concentration in the component (A) glycidyl ether type epoxy resin is high, the viscosity of the masterbatch-type latent curing agent for epoxy resin becomes higher, which deteriorates handling properties as well as the storage stability. Therefore, it is preferable that the chlorine concentration in the component (A) glycidyl ether type epoxy resin is 2000 ppm or less.

The above component (B) is a fine particle comprised of mixture of (B-1) adduct-modified amine obtained by reacting the glycidyl ether type epoxy resin with the polyamine compound, and the (B-2) phenol compound.

Examples of the above glycidyl ether type epoxy resin include compounds cited as the above component (A). As for the glycidyl ether type epoxy resin used for the (B-1), it is preferable that the chlorine concentration is 2000 ppm or less, in the same way as the above component (A).

Examples of the polyamine are ethylenediamine, diethylenetriamine, triethylenetetramine, tetraethylenepentamine, hexamethylenediamine, isophorone diamine, bis(4-amino-3-methylcyclohexyl)methane, diamino dicyclohexyl methane, metaxylene diamine, diamino diphenyl methane, diamino diphenyl sulfone, metaphenylene diamine, imidazoles such as 2-methyl imidazole, 2-ethyl-4-methyl imidazole, 2-isopropyl imidazole, 2-undecyl imidazole, 2-heptadecyl imidazole, 2-phenyl imidazole, 2-ohenyl-4-methyl imidazole and 2-aminopropyl imidazole; N,N-dimethyl aminoethyl amine, N,N-diethyl aminoethyl amine, N,N-diisopropyl aminoethyl amine, N,N-diallyl aminoethyl amine, N,N-benzylmethyl aminoethyl amine, N,N-dibenzyl aminoethyl amine, N,N-cyclohexylmethyl aminoethyl amine, N,N-dicyclohexyl aminoethyl amine, N-(2-aminoethyl)pyrrolidine, N-(2-aminoethyl)piperidine, N-(2-aminoethyl)morpholine, N-(2-aminoethyl)piperazine, N-(2-aminoethyl)-N'-methyl piperazine, N,N-dimethyl aminopropyl amine, N,N-diethyl aminopropyl amine, N,N-diisopropyl aminopropyl amine, N,N-diallyl aminopropyl amine, N,N-benzylmethyl aminopropyl amine, N,N-dibenzyl aminopropyl amine, N,N-cyclohexyl methyl aminopropyl amine, N,N-dicyclohexyl aminopropyl amine, N-(3-aminopropyl)pyrrolidine, N-(3-aminopropyl)piperidine, N-(3-aminopropyl)morpholine, N-(3-aminopropyl)piperazine, N-(3-aminopropyl)-N'-methyl piperidine, 4-(N,N-dimethyl amino)benzyl amine, 4-(N,N-diethyl amino)benzyl amine, 4-(N,N-diisopropyl amino)benzyl amine, N,N-dimethyl isophorone diamine, N,N-dimethyl bisamino cyclohexane, N,N,N'-trimethyl ethylene diamine, N'-ethyl-N,N-dimethyl ethylene diamine, N,N,N'-trimethyl ethylene diamine, N'-ethyl-N,N, dimethyl propane diamine and N'-ethyl-N,N-dibenzyl amino propyl amine; N,N-(bisaminopropyl)-N-methyl amine, N,N-bisaminopropyl ethyl amine, N,N-bisaminopropyl propyl amine, N,N-bisaminopropyl butyl amine, N,N-bisaminopropyl pentyl amine, N,N-bisaminopropyl hexyl amine, N,N-bisaminopropyl-2-ethylhexyl amine, N,N-bisaminopropyl cyclohexyl amine, N,N-bisaminopropyl benzyl amine, N,N-bisaminopropyl allyl amine, bis[3-(N,N-dimethyl aminopropyl)]amine, bis[3-(N,N-diethylaminopropyl)]amine, bis[3-(N,N-diisopropyl aminopropyl)]amine and bis[3-(N,N-dibutyl aminopropyl)]amine.

In order to produce the above (B-1) adduct-modified amine, it is required to react 0.25 to 0.75 mol of glycidyl ether type epoxy resin with 1 mol of polyamine, and the reaction of 0.4 to 0.6 mol of glycidyl ether type epoxy resin with 1 mol of polyamine is preferred.

The method for carrying out the above reaction is not limited in particular. For instance, there is a method wherein a compound having a secondary or tertiary amino group is dissolved in a solvent, then the glycidyl ether type epoxy resin is added to the obtained solution little by little, and next the reaction is carried out by heating the solution to the temperature of 100° C. or more.

Examples of the solvents which are used for reacting the above polyamine with the glycidyl ether type epoxy resin are hydrocarbons such as benzene, toluene, xylene, cyclohexene, mineral spirit and naphtha; ketones such as acetone, methylethyl ketone and methyl isobutyl ketone; esters such as ethyl acetate, n-butyl acetate and propylene glycol monomethyl ethyl ether acetate; and alcohols such as methanol, isopropanol, n-butanol, butyl cellosolve and butyl carbitol.

The above (B-2) phenol compound is not limited in particular. Examples include phenol resins synthesized by 2,2-bis(4-hydroxyphenyl) propane (known as bisphenol A), or phenol resins synthesized by phenols and aldehydes.

Examples of the above phenols are phenol, cresol, ethylphenol, n-propylphenol, isopropylphenol, butylphenol, tert-butylphenol, octylphenol, nonylphenol, dodecylphenol, cyclohexylphenol, phenylphenol, chlorophenol, bromophenol, xylenol, resorcin, catechol, hydroquinone, 2,2-bis(4-hydroxyphenyl) propane, 4,4'-thiodiphenol, dihydroxydiphenylmethane, naphthol, terpenephenol and phenolized dicyclopentadiene etc. An example of the above aldehydes is formaldehyde.

The particle comprised of the mixture of the component (B) is obtained by, first, mixing the above (B-1) and (B-2) components in a solvent by heating, then distilling the solvent away, and finally crushing the residue.

Examples of the solvents used here are hydrocarbons such as benzene, toluene, xylene, cyclohexene, mineral spirit and naphtha; ketones such as acetone, methylethyl ketone and methyl isobutyl ketone; esters such as ethyl acetate, n-butyl acetate and propylene glycol monomethyl ethyl ether acetate; and alcohols such as methanol, isopropanol, n-butanol, butyl cellosolve and butyl carbitol.

With regard to the mixing ratio of the above components (B-1) and (B-2), it is required that the component (B-1) is 50 to 99 mass % and the component (B-2) is 1 to 50 mass %. It is preferable that the component (B-1) is 70 to 90 mass % and the component (B-2) is 10 to 30 mass %. If the mixing ratio of the component (B-2) is less than 1 mass %, the viscosity of the masterbatch-type latent curing agent for epoxy resin becomes higher and the handling properties deteriorate. If the component (B-2) is more than 50 mass %, curing properties deteriorates since a curing temperature of epoxy resin becomes higher.

Furthermore, it is required that the volume average particle diameter of the fine particle of the mixed component (B) is 100 μm or less, and 0.1 to 10 μm is preferable.

Examples of an active hydrogen compound of the aforementioned component (C) include water, a compound having more than one primary and/or secondary amino group in one molecule, and a compound having more than one hydroxyl group in one molecule.

Examples of the above compound having more than one primary and/or secondary amino group in one molecule are aliphatic amine, alicyclic amine and aromatic amine.

Examples of the aliphatic amine are alkylamine such as methylamine, ethylamine, propylamine, butylamine and dibutylamine; alkylene diamine such as ethylene diamine, propylene diamine, butylene diamine and hexamethylene diamine; polyalkylene polyamine such as diethylene triamine, triethylenetetramine and tetraethylenepentamine; polyoxyalkylene polyamines such as polyoxypropylene diamine and polyoxyethylene diamine.

Examples of the alicyclic amine are cyclopropyl amine, cyclobutyl amine, cyclopentyl amine, cyclohexyl amine and isophorone diamine.

Examples of the aromatic amine are aniline, toluidine, benzylamine, naphthylamine, diamino diphenyl methane and diaminodiphenyl sulfone.

Examples of the aforementioned compound having more than one hydroxyl group in one molecule are an alcohol compound and a phenol compound.

Examples of the alcohol compound are monoalcohols such as methyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, dodecyl alcohol, stearyl alcohol, eicosyl alcohol, allyl alcohol, crotyl alcohol, propargyl alcohol, cyclopentanol, cyclohexanol, benzyl alcohol, cinnamyl alcohol, ethylene glycol monomethyl ether, ethylene glycol monoethyl ether, ethylene glycol monoethyl ether and diethylene glycol monobutyl ether; and polalcohols such as ethylene glycol, polyethylene glycol, propylene glycol, polypropylene glycol, 1,3-butanediol, 1,4-butanediol, hydrogenated bisphenol A, neopentyl glycol, glycerine, trimethylol propane and pentaerythritol.

In addition, examples of the phenol compound are compounds cited as the above component (B-1).

Examples of the isocyanate compound of aforementioned component (D) are propane-1,2-diisocyanate, 2,3-dimethyl butane-2,3-diisocyanate, 2-methyl pentane-2,4-diisocyanate, octane-3,6-diisocyanate, 3,3-dinitropentane-1,5-diisocyanate, octane-1,6-diisocyanate, 1,6-hexamethylene diisocyanate (HDI), trimethyl hexamethylene diisocyanate, lysin diisocyanate, tolylenediisocyanate (TDI), xylylene diisocyanate, metatetra methyl xylylene diisocyanate, isophorone diisocyanate (3-isocyanate methyl-3,5,5-trimethyl cyclohexyl isocyanate), 1,3- or 1,4-bis(isocyanate methyl) cyclohexane, diphenyl methane-4,4'-diisocyanate (MDI), dicyclohexyl methane-4,4'-diisocyanate (hydrogenerated MDI), hydrogenerated tolylenediisocyanates and mixtures thereof.

Also adduct type polyisocyanates such as isocyanurate type polyisocyanate, biuret type polyisocyanate, urethane type polyisocyanate and allophanate type polyisocyanate can be used as the component (D).

The above isocyanurate type polyisocyanate can be obtained by cyclizing the above isocyanate compound to trimerize using quaterrized ammonium salt or the like.

In addition, the biuret type polyisocyanate can be obtained by reacting the above isocyanate compound with agents for a biuret reaction such as water.

Furthermore, the urethane type and/or allophanate type polyisocyanate can be obtained by reacting the above isocyanate compound with monoalcohol and/or polyol.

Examples of the monoalcohol used here are n-butanol, 2-ethyl hexanol, butyl cellosolve and polyethylene glycol monoethyl ether, and examples of polyol used here are ethylene glycol, propylene glycol, 1,3 butanediol, 1,4 butanediol, diethylene glycol, polyethylene glycol, polypropylene glycol, polytetramethylene glycol and trimethylol propane. These monoalcohols or polyols may be used alone, or more than two kinds of them may be used together.

The masterbatch-type latent curing agent for epoxy resin of the present invention may be obtained by reacting the component (D) with the mixture of the above components (A), (B) and (C). Specifically, the component (D) is added to the mixture of the components (A), (B) and (C), then the reaction by heating is carried out at about 40 to 60° C. After confirming by using the IR that the isocyanate group disappears, the reaction mixture is further aged at about 40 to 60° C. for 2 to 12 hours.

As for each blending ratio of each component, the component (A) is 50 to 78.9 mass %, the component (B) is 20 to 48.9 mass %, the component (C) is 0.1 to 1.5 mass % and the component (D) is 1 to 15 mass %.

In addition, it is preferable that the viscosity of the masterbatch-type latent curing agent for epoxy resin obtained by the present invention is 20 Pa·s/25° C. to 400 Pa·s/25° C. from the viewpoints of workability and ease of blending.

The one-component curable epoxy resin composition of the present invention is comprised of the masterbatch-type latent curing agent for epoxy resin of the present invention and epoxy resin.

Examples of the epoxy resin used for the one-component curable epoxy resin composition of the present invention are polyglycidyl ether compounds of mononuclear multivalent phenol compounds such as hydroquinone, resorcin, pyrocatechol and phloroglucinol; polyglycidyl ether compounds of multinuclear multivalent phenol compounds such as dihydroxy naphthalene, biphenol, methylenebisphenol (known as bisphenol F), methylene bis(orthocresol), ethylidene bisphenol, isopropylidene bisphenol (known as bisphenol A), isopropylidene bis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfonylbisphenol, oxybisphenol, phenol novolac, orthocresol novolac, ethylphenol novolac, butylphenol novolac, octylphenol novolac, resorcin novolac and terpenephenol; polyglycidyl ether compounds of polyalcohols such as ethylene oxide addition products of ethyleneglycol, propylene glycol, butylene glycol, hexanediol, polyglycol, thiodiglycol, glycerin, trimethylol propane, pentaerythritol, sorbitol or bisphenol A; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, endomethylene tetrahydrophthalic acid, and homopolymers or copolymers of glycidyl methacrylate; epoxy compounds having glycidylamino groups such as N,N-diglycidyl aniline, bis(4-(N-methyl-N-glycidylamino)phenyl)methane and diglycidyl orthotoluidine; epoxidized compounds of cyclic olefin compounds such as vinylcyclohexene diepoxide, dicyclopentadiene diepoxide, 3,4-epoxy cyclohexylmethyl-3,4-epoxycyclohexane carboxylate, 3,4-epoxy-6-methylcyclohexylmethyl-6-methylcyclohexane carboxylate and bis (3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidylisocyanurate.

These epoxy resins may be internally cross-linked by a prepolymer having isocyanate groups at terminals, or may be polymerized with multivalent active hydrogen compounds such as polyhydric phenol, polyamine, a carbonyl group-containing compound and polyphosphate ester.

Furthermore, the curable epoxy resin composition of the present invention may contain commonly used additives, if necessary, such as a curing catalyst; reactive or nonreactive diluting agents (plasticizing agents) such as monoglycidyl ethers, dioctyl phthalate, dibutyl phthalate, benzyl alcohol and coal tar; fillers or pigments such as glass fiber, carbon fiber, cellulose, siliceous sand, cement, kaolin, clay, aluminum hydroxide, bentonite, talc, silica, fine powder silica, titanium dioxide, carbon black, graphite, iron oxide, a bituminous substance, metallic particle and resin particle coated with metal; thickeners; thixotropic agents; flame retardants; defoamers; anticorrosive agents; colloidal silica and colloidal alumina, and moreover can contain sticky resins such as xylene resin and petroleum resin.

EXAMPLES

The masterbatch-type latent curing agent for epoxy resin of the present invention will now be described in more detail referring to Manufacturing examples and Examples. However, the invention should not be construed as being limited to these examples.

Manufacturing Example 1

Manufacture of Fine Particle A 164 g (2.0 mol) of 2-methyl imidazole was dissolved in 150 g of methyl propylene glycol, then 380 g (1.0 mol) of ADEKA RESIN EP-4100E (Commercial name of the product manufactured by ADEKA CORPORATION; it is a bisphenol A diglycidyl ether type epoxy resin, and its epoxy equivalent is 190) was added by portions at 60 to 100° C. to carry out the aging reaction. Next, the reaction mixture was heated to 180° C. to remove the methyl propylene glycol and the solid material (a) having a melting point of 100° C. was obtained. The obtained solid material (a) was crushed to obtain the fine particle A having a volume average particle diameter of 5 μm.

Manufacturing Example 2

Manufacture of Fine Particle B 82 g (1.0 mol) of 2-methyl imidazole was dissolved in 150 g of methyl propylene glycol, then 190 g (0.5 mol) of ADEKA RESIN EP-4100E (Commercial name of the product manufactured by ADEKA CORPORATION; it is a bisphenol A diglycidyl ether type epoxy resin, and its epoxy equivalent is 190) was added by portions at 60 to 100° C. Next 102 g (1.0 mol) of N,N-dimethyl amino propyl amine was further dissolved into the reaction mixture, and similarly 190 g (0.5 mol) of ADEKA RESIN EP-4100E (Commercial name of the product manufactured by ADEKA CORPORATION; it is a bisphenol A diglycidyl ether type epoxy resin, and its epoxy equivalent is 190) was added by portions at 60 to 100° C. to carry out the aging reaction. After that, the reaction mixture was heated to 180° C. to remove the methyl propylene glycol and a solid material (b) having a melting point of 90° C. was obtained. The obtained solid material (b) was crushed to obtain the fine particle B having a volume average particle diameter of 5 μm.

Manufacturing Example 3

Manufacture of Mixture Fine Particle C 480 g of the solid material (a) obtained in the Manufacturing example 1 was dissolved in 150 g of methyl propylene glycol while the reaction system was heated to 180° C., then 120 g of phenol novolac resin (The OH equivalent is 78 and a melting point is 95° C.) was added. Next, the methyl propylene glycol was removed under reduced pressure to obtain a solid material having a melting point of 100° C. The obtained solid material was crushed to obtain the mixture fine particle C having a volume average particle diameter of 5 μm.

Manufacturing Example 4

Manufacture of Mixture Fine Particle D 480 g of the solid material (b) obtained in the Manufacturing example 2 was dissolved in 150 g of methyl propylene glycol while the reaction system was heated to 180° C., then 120 g of phenol novolac resin (The OH equivalent is 78 and a melting point is 95° C.) was added. After that, the methyl propylene glycol was removed under reduced pressure to obtain a solid material having a melting point of 95° C. The obtained solid material was crushed to obtain the mixture fine particle D having a volume average particle diameter of 5 μm.

Manufacturing Example 5

Manufacture of Mixture Fine Particle E 360 g of the solid material (b) obtained in the Manufacturing example 2 was dissolved in 150 g of methyl propylene glycol while the reaction system was heated to 180° C., then 240 g of phenol novolac resin (The OH equivalent is 78 and a melting point is 95° C.) was added. After that, the methyl propylene glycol was removed under reduced pressure to obtain a solid material having a melting point of 100° C. The obtained solid material was crushed to obtain the mixture fine particle E having a volume average particle diameter of 5 μm.

Manufacturing Example 6

Manufacture of Mixture Fine Particle F

Except that the cresol novolac resin (The OH equivalent is 90 and a melting point is 110° C.) was used instead of the phenol novolac resin, a mixture fine particle F having a volume average particle diameter of 5 μm was obtained in the same way as the Manufacturing example 3.

Manufacturing Example 7

Manufacture of Mixture Fine Particle G 240 g of the solid material (b) obtained in the Manufacturing example 2 was dissolved in 150 g of methyl propylene glycol while the reaction system was heated to 180° C., then 360 g of phenol novolac resin (The OH equivalent is 78 and a melting point is 95° C.) was added. After that, the methyl propylene glycol was removed under reduced pressure to obtain a solid material having a melting point of 100° C. The obtained solid material was crushed to obtain the mixture fine particle G having a volume average particle diameter of 5 μm.

Example 1

6.2 g of water and 300 g of mixture fine particle C obtained in the Manufacturing example 3 were added to 700 g of ADEKA RESIN EP-4100L (Commercial name of bisphenol A diglycidyl ether type epoxy resin manufactured by ADEKA CORPORATION: the epoxy equivalent is 170 g/eq and the chloride concentration is 600 ppm). After mixing uniformly, 30.0 g (0.34 mol) of tolylenediisocyanate (TDI) was added to react at 40~50° C. for 2 hours. Then, after confirming that the IR absorption spectra caused by NCO disappeared, the aging reaction was further carried out at 40 to 50° C. for 2 hours under reduced pressure to obtain the masterbatch-type latent curing agent for epoxy resin.

Example 2

Except that the mixture fine particle D was used instead of the mixture fine particle C, the masterbatch-type latent curing agent for epoxy resin was obtained in the same way as the Example 1.

Example 3

Except that the mixture fine particle E was used instead of the mixture fine particle C, the masterbatch-type latent curing agent for epoxy resin was obtained in the same way as the Example 1.

Comparative Example 1

Except that the fine particle A was used instead of the mixture fine particle C, the masterbatch-type latent curing agent for epoxy resin was obtained in the same way as the Example 1.

Comparative Example 2

Except that the fine particle B was used instead of the mixture fine particle C, the masterbatch-type latent curing agent for epoxy resin was obtained in the same way as the Example 1.

Example 4

Except that ADEKA RESIN EP-4100 (Commercial name of bisphenol A diglycidyl ether type epoxy resin, manufactured by ADEKA CORPORATION: the epoxy equivalent is 190 g/eq and the chloride concentration is 2,500 ppm) was used instead of the ADEKA RESIN EP-4100L, the masterbatch-type latent curing agent for epoxy resin was obtained in the same way as the Example 1.

Example 5

Except that the mixture fine particle F was used instead of the mixture fine particle C, the masterbatch-type latent curing agent for epoxy resin was obtained in the same way as the Example 1.

Example 6

10.5 g of glycerin and 300 g of mixture fine particle C obtained in the Manufacturing example 3 were added to 700 g of ADEKA RESIN EP-4100L (Commercial name of bisphenol A diglycidyl ether type epoxy resin manufactured by ADEKA CORPORATION: the epoxy equivalent is 170 g/eq and the chloride concentration is 600 ppm). After mixing uniformly, 30.0 g (0.34 mol) of tolylenediisocyanate (TDI) was added to react at 40 to 50° C. for 2 hours. Then, after confirming that the IR absorption spectra caused by NCO disappeared, the aging reaction was further carried out at 40 to 50° C. for 2 hours under reduced pressure to obtain the masterbatch-type latent curing agent for epoxy resin.

Example 7

6.2 g of water and 300 g of mixture fine particle C obtained in the Manufacturing example 3 were added to 700 g of ADEKA RESIN EP-4100L (Commercial name of bisphenol A diglycidyl ether type epoxy resin manufactured by ADEKA CORPORATION: the epoxy equivalent is 170 g/eq and the chloride concentration is 600 ppm). After mixing uniformly, 34.7 g (0.34 mol) of norbornene diisocyanate (NBDI) was added to react at 40 to 50° C. for 2 hours. Then, after confirming that the IR absorption spectra caused by NCO disappeared, the aging reaction was further carried out at 40 to 50° C. for 2 hours under reduced pressure to obtain the masterbatch-type latent curing agent for epoxy resin.

Comparative Example 3

Except that the mixture fine particle G was used instead of the mixture fine particle C, the masterbatch-type latent curing agent for epoxy resin was obtained in the same way as the Example 1.

According to the procedures described below, tests for evaluating physical properties of masterbatch-type latent curing agent for epoxy resin were carried out with regard to the Examples and Comparative examples.

[Epoxy Equivalent]

"Epoxy equivalent" means mass of epoxy resin including 1 equivalent of epoxy group. The epoxy equivalents of diglycidyl ether type epoxy resins used in each Example and each Comparative example were measured according to JIS K-7236.

[Chloride Concentration]

Diglycidyl ether type epoxy resins used in each Example and each Comparative example were burned to oxidize under an atmosphere of $Ar/O_2$. After produced hydrogen chlorides were collected in absorbing liquids, chloride concentrations were measured based on the silver ion, using the potentiometric titrator to calculate the chloride concentration in the epoxy resin.

[Viscosity]

The viscosity of masterbatch-type latent curing agent for epoxy resin just after manufacture was measured at 25° C. using the BM type viscometer.

[Melting Point]

The melting point was measured using the melting point determination apparatus manufactured by Yanaco New Science Inc.

[Curing Properties of Masterbatch-Type Latent Curing Agent for Epoxy Resin]

120 g of the masterbatch-type curing agent obtained was mixed uniformly with 100 g of ADEKA RESIN EP-4901E (Commercial name of bisphenol F diglycidyl ether type epoxy resin manufactured by ADEKA CORPORATION: the epoxy equivalent is 170 g/eq) to measure by DSC (the rate of temperature increase is 10° C./min.). The maximum heat generation temperature was read from the chart obtained, which shows the exothermal behavior of the sample, and the temperature was defined as a curing temperature.

[Storage Stability of Masterbatch-Type Latent Curing Agent for Epoxy Resin]

Masterbatch type curing agents obtained in each Example and each Comparative example were stored under an atmosphere of 40° C. After one month passed, the viscosities were measured using the BM type viscometer to calculate the thickening ratio relative to the viscosity just after manufacture. With regard to evaluation method, ⊚ means that the thickening ratio is less than double, ○ means that the thickening ratio is more than double, but less than 4 times, Δ means that the thickening ratio is 4 times or more and x means that the masterbatch-type curing agent turned into a gel.

[Solvent Resistance Stability of Masterbatch-Type Latent Curing Agent for Epoxy Resin]

120 g of masterbatch-type latent curing agent was mixed uniformly with 100 g of ADEKA RESIN EP-4901E (Commercial name of bisphenol F diglycidyl ether type epoxy resin manufactured by ADEKA CORPORATION: the epoxy equivalent is 170 g/eq) to manufacture one-component epoxy resin composition.

100 mass parts of this one-component epoxy resin composition was mixed with 20 mass parts of mixed solvent of toluene/ethyl acetate (mass ratio is 1/1) to manufacture a mixed varnish.

With regard to this mixed varnish, the viscosities at 25° C., just after mixing with the mixed solvent, and after still standing of mixture thereof at 40° C. for 6 hours were measured using the BM type viscometer and the thickening ratios were calculated.

In addition, the thickening ratios for the case wherein the mixed solvent of ethyl acetate/MEK (mass ratio=1/1) was used, were also calculated.

With regard to the evaluation method of solvent stability, the following standards were used.
⊚ means that the thickening ratio is less than double.
○ means that it is double or more, but less than four times.
Δ means it is 4 times or more.
x means it turned into a gel.

TABLE 1

|  | Examples | | | Comparative examples | |
|---|---|---|---|---|---|
|  | 1 | 2 | 3 | 1 | 2 |
| Viscosity (Pa · s/25° C.) | 45 | 38 | 35 | 65 | 54 |
| Curing properties: Maximum exothermic temperature (° C.) | 123 | 125 | 128 | 118 | 120 |
| Storage stability | ○ | ○ | ⊚ | Δ | Δ |
| Solvent stability: toluene/ethyl acetate | ⊚ | ⊚ | ⊚ | Δ | Δ |
| Solvent stability: ethyl acetate/MEK | ○ | ○ | ○ | X | X |

TABLE 2

|  | Examples | | | | Comparative example |
|---|---|---|---|---|---|
|  | 4 | 5 | 6 | 7 | 3 |
| Viscosity (Pa · s/25° C.) | 150 | 51 | 40 | 50 | 32 |
| Curing properties: Maximum exothermic temperature (° C.) | 122 | 128 | 122 | 124 | 138 |
| Storage stability | Δ | ○ | ⊚ | ○ | ○ |
| Solvent stability: toluene/ethyl acetate | ⊚ | ⊚ | Δ | ○ | ○ |
| Solvent stability: ethyl acetate/MEK | ○ | ○ | Δ | Δ | Δ |

From the results shown in Tables 1 and 2, it was confirmed that, one-component curable epoxy resin composition having low viscosity, excellent curing properties and solvent stability can be obtained by combining the masterbatch-type latent curing agent for epoxy resin of the present invention with epoxy resin.

Furthermore, it was also confirmed that, with regard to a mixture particle comprised of components (B-1) and (B-2), if the component (B-2) is more than 50 mass %, the curing properties of the particle are deteriorated.

Particularly, in cases where an epoxy adduct obtained by using glycidyl ether type epoxy resin which includes 2,000 ppm or less of chloride was used, it was confirmed that the viscosity of masterbatch-type latent curing agent for epoxy resin itself is low, and also it was confirmed that one-component epoxy resin composition having an excellent storage stability can be obtained by using this masterbatch-type latent curing agent itself with epoxy resin.

INDUSTRIAL APPLICABILITY

The masterbatch-type latent curing agent for epoxy resin of the present invention has an excellent storage stability and curing properties and can provide one-component curable epoxy composition useful for manufacturing an adhesive agent, a paste-like composition, a film-like composition, an anisotropically conductive material, a sealing material, a coating material and a prepreg etc.

What is claimed is:

1. A masterbatch latent curing agent having a viscosity of 20 Pa·s/25° C. to 400 Pa·s/25° C. for epoxy resin comprising components (A) to (D);
   - (A) glycidyl ether epoxy resin containing 600 ppm or less of chlorine,
   - (B) a fine particle mixture containing (B-1) 50 to 99 mass % of adduct-modified amine obtained by reacting the glycidyl ether epoxy resin with a polyamine compound and (B-2) 50 to 1 mass % of a phenol compound,
   - (C) an active hydrogen compound, and
   - (D) an isocyanate compound.

2. A masterbatch latent curing agent for epoxy resin according to claim 1, wherein component (D) is reacted with a mixture of the components from (A) to (C).

3. A one-component curable epoxy resin composition comprised of the masterbatch latent curing agent for epoxy resin described in claim 1, and epoxy resin.

* * * * *